US009135715B1

(12) United States Patent
Klingner et al.

(10) Patent No.: US 9,135,715 B1
(45) Date of Patent: Sep. 15, 2015

(54) LOCAL FEATURE CAMERAS FOR STRUCTURE FROM MOTION (SFM) PROBLEMS WITH GENERALIZED CAMERAS

(75) Inventors: Bryan Klingner, Oakland, CA (US); David Martin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 13/427,121

(22) Filed: Mar. 22, 2012

(51) Int. Cl.
*G06K 9/00* (2006.01)
*G06T 7/20* (2006.01)
*H04N 5/232* (2006.01)

(52) U.S. Cl.
CPC ............... *G06T 7/20* (2013.01); *G06T 7/2093* (2013.01); *H04N 5/2329* (2013.01)

(58) Field of Classification Search
None
See application file for complete search history.

(56) References Cited

U.S. PATENT DOCUMENTS

| | | | |
|---|---|---|---|
| 6,496,598 B1 * | 12/2002 | Harman | 382/154 |
| 6,661,913 B1 | 12/2003 | Zhang et al. | |
| 6,970,591 B1 * | 11/2005 | Lyons et al. | 382/154 |
| 7,616,807 B2 * | 11/2009 | Zhang et al. | 382/154 |
| 7,844,134 B2 | 11/2010 | Sasaki et al. | |
| 8,014,588 B2 | 9/2011 | Rudin et al. | |
| 8,442,307 B1 * | 5/2013 | Anati et al. | 382/154 |
| 2002/0113865 A1 * | 8/2002 | Yano et al. | 348/47 |
| 2003/0012410 A1 * | 1/2003 | Navab et al. | 382/103 |
| 2007/0030342 A1 * | 2/2007 | Wilburn et al. | 348/47 |
| 2007/0120997 A1 | 5/2007 | Sasaki et al. | |
| 2010/0158482 A1 * | 6/2010 | Sikora et al. | 386/95 |
| 2011/0267514 A1 | 11/2011 | D'Angelo et al. | |
| 2011/0311104 A1 * | 12/2011 | Sinha et al. | 382/106 |
| 2012/0045091 A1 | 2/2012 | Kaganovich | |
| 2012/0236124 A1 * | 9/2012 | Aoki | 348/47 |
| 2012/0327194 A1 * | 12/2012 | Shiratori et al. | 348/47 |
| 2013/0044186 A1 * | 2/2013 | Jin et al. | 348/46 |
| 2013/0128121 A1 * | 5/2013 | Agarwala et al. | 348/607 |
| 2014/0168461 A1 * | 6/2014 | Dani et al. | 348/222.1 |
| 2014/0285486 A1 * | 9/2014 | Chang et al. | 345/420 |

OTHER PUBLICATIONS

Bujnak, Martin, Zuzana Kukelova, and Tomas Pajdla. "A general solution to the P4P problem for camera with unknown focal length." Computer Vision and Pattern Recognition, 2008. CVPR 2008. IEEE Conference on. IEEE, 2008.*
Mouragnon, Etienne, et al. "Generic and real-time structure from motion using local bundle adjustment." Image and Vision Computing 27.8 (2009): 1178-1193.*
Klingner, Bryan, David Martin, and James Roseborough. "Street View Motion-from-Structure-from-Motion."*

(Continued)

*Primary Examiner* — Stephen R Koziol
*Assistant Examiner* — Sean Conner
(74) *Attorney, Agent, or Firm* — Lerner, David, Littenberg, Krumholz & Mentlik, LLP (57) ABSTRACT

Methods and systems for extraction of 3D geometry from a plurality of generalized camera images by a device that comprises an electronic circuit are provided. Methods include identifying an x and y coordinate, an orientation, and a scale for each of one or more feature locations in each of the generalized camera images, extracting a local image feature at each feature location, generating a feature camera centered on each feature location, identifying groups of feature cameras providing consistent triangulation opportunity, and triangulating each identified feature camera group by finding the 3D point that minimizes an error term.

18 Claims, 6 Drawing Sheets

(56) References Cited

OTHER PUBLICATIONS

Ait-Aider, Omar, and Francois Berry. "Structure and kinematics triangulation with a rolling shutter stereo rig." Computer Vision, 2009 IEEE 12th International Conference on. IEEE, 2009.*

Hedborg, Johan, et al. "Rolling shutter bundle adjustment." Computer Vision and Pattern Recognition (CVPR), 2012 IEEE Conference on. IEEE, 2012.*

Gennery, Donald B. "Generalized camera calibration including fisheye lenses." International Journal of Computer Vision 68.3 (2006): 239-266.*

Bartoli, Adrien, and Peter Sturm. "Structure-from-motion using lines: Representation, triangulation, and bundle adjustment." Computer Vision and Image Understanding 100.3 (2005): 416-441.*

Everingham, Mark, et al. "Pascal visual object classes challenge results." Available from www.pascal-network.org (2005).*

Fitzgibbon, Andrew W. "Simultaneous linear estimation of multiple view geometry and lens distortion." Computer Vision and Pattern Recognition, 2001. CVPR 2001. Proceedings of the 2001 IEEE Computer Society Conference on. vol. 1. IEEE, 2001.*

Irschara, Arnold, et al. "From structure-from-motion point clouds to fast location recognition." Computer Vision and Pattern Recognition, 2009. CVPR 2009. IEEE Conference on. IEEE, 2009.*

Peng, Keju, et al. "3D reconstruction based on SIFT and Harris feature points." Robotics and Biomimetics (ROBIO), 2009 IEEE International Conference on. IEEE, 2009.*

Chiuso, Alessandro, et al. "Structure from motion causally integrated over time." Pattern Analysis and Machine Intelligence, IEEE Transactions on 24.4 (2002): 523-535.*

Gordon, Iryna, and David G. Lowe. "What and where: 3D object recognition with accurate pose." Toward category-level object recognition. Springer Berlin Heidelberg, 2006. 67-82.*

Hedborg, Johan, et al. "Structure and motion estimation from rolling shutter video." Computer Vision Workshops (ICCV Workshops), 2011 IEEE International Conference on. IEEE, 2011.*

Koenderink, Jan J., and Andrea J. Van Doorn. "Affine structure from motion." JOSA A 8.2 (1991): 377-385.*

Nistér, David. "An efficient solution to the five-point relative pose problem." Pattern Analysis and Machine Intelligence, IEEE Transactions on 26.6 (2004): 756-770.*

Schaffalitzky, Frederik, and Andrew Zisserman. "Multi-view matching for unordered image sets, or "How do I organize my holiday snaps?"." Computer Vision—ECCV 2002. Springer Berlin Heidelberg, 2002. 414-431.*

* cited by examiner

Figure 1: Projection in a linear, pinhole camera (prior art)

Fig. 4 Construction of Feature Camera

Fig. 5  Normalization of Feature Camera Focal Length

Fig.6 Extraction of 3D Geometry from a set of generalized cameras with known or approximately known pose

LOCAL FEATURE CAMERAS FOR STRUCTURE FROM MOTION (SFM) PROBLEMS WITH GENERALIZED CAMERAS

BACKGROUND

1. Statement of the Technical Field

Embodiments include systems and methods for efficiently generating 3D geometry from multiple images of a scene.

2. Description of the Related Art

Computer vision is a scientific and technological field that seeks to develop methods for acquiring, processing, analyzing, and understanding images. Specifically, computer vision practitioners seek to develop theories and models designed to extract information about a three dimensional scene from one or more two dimensional images of the scene captured by one or more cameras. Applying these models, it is possible to reconstruct an approximation of the three dimensional space from the two dimensional images.

Structure from motion ("SFM") is the process of computing 3D geometry from multiple images of a scene. In SFM problems in computer vision and robotics, both world-to-image and image-to-world projection functions are typically used for the camera(s) in question in order to implement crucial substeps of an SFM algorithm, such as triangulation, reprojection error measurement, and bundle adjustment.

Figure 1:
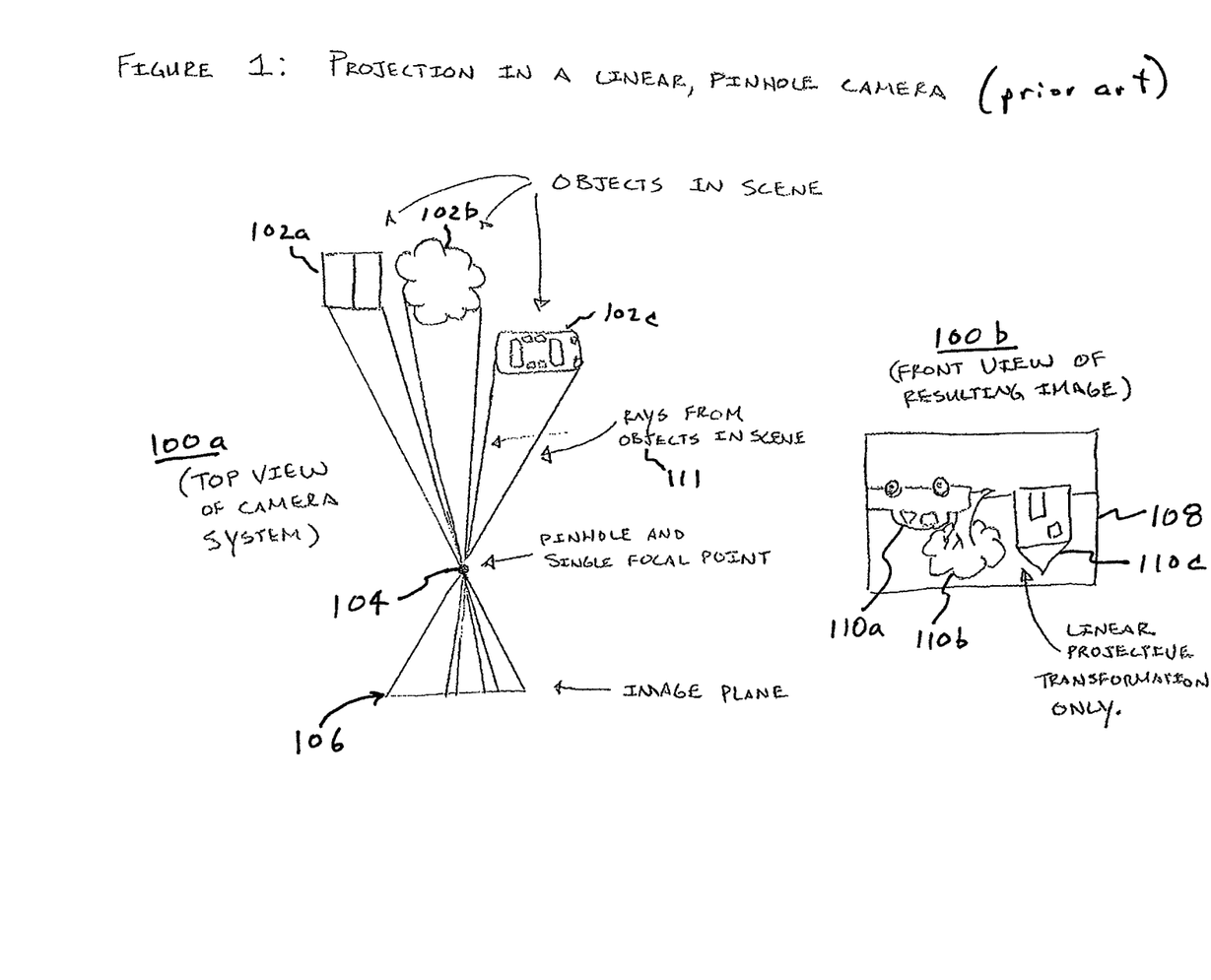
FIG. 1 is a block diagram of a linear, pinhole camera system.

Often, a linear perspective—or pinhole—instantaneous shutter camera model is assumed in order to simplify the algorithms and optimization problems. FIG. 1 depicts a typical optimal projection using a linear, pinhole camera. From a top view 100a, rays 111 from objects 102a, 102b, 102c proceed through a single focal point 104 onto an image plane 106. As evident on a front view 100b of the resulting image plane 108, the object images 100a, 100b, 100c appear relatively undistorted, with only a linear projective transformation needed to correct the image to an appropriate world-view.

However, with sufficiently complex cameras, particularly when the cameras are in motion, an instantaneous shutter pinhole camera model may introduce intolerable errors to a traditional SFM process. To compound these problems, moving rolling shutter cameras and/or lens distortions can greatly increase non-linear image distortions. These distortions tend to accumulate with distance over the each image. In addition, multiple cameras are often used to produce images input to an SFM model, each having different focal points. These cameras are often referred to as "general" or "generalized" cameras, and the images captured as "generalized" images.

Lens distortion denotes how light rays deviate from a pinhole projection model as they pass through the lens system of a camera. Lens distortion is often radial in nature, with the distortion proportional to the distance from the image focal point.

A rolling shutter camera is one where the pixels of an image are not exposed at a single time T, but according to some function T(x, y) that varies according to the image pixel position (x, y). For example, a simple rolling shutter function is T(x, y)=a+b*x, where a and b are constants, so that each column is exposed sequentially across the image frame. In contrast to a rolling shutter camera, an instantaneous shutter camera exposes all image pixels at approximately the same time, e.g., T(x, y)=a, where a is a constant.

Figure 2:
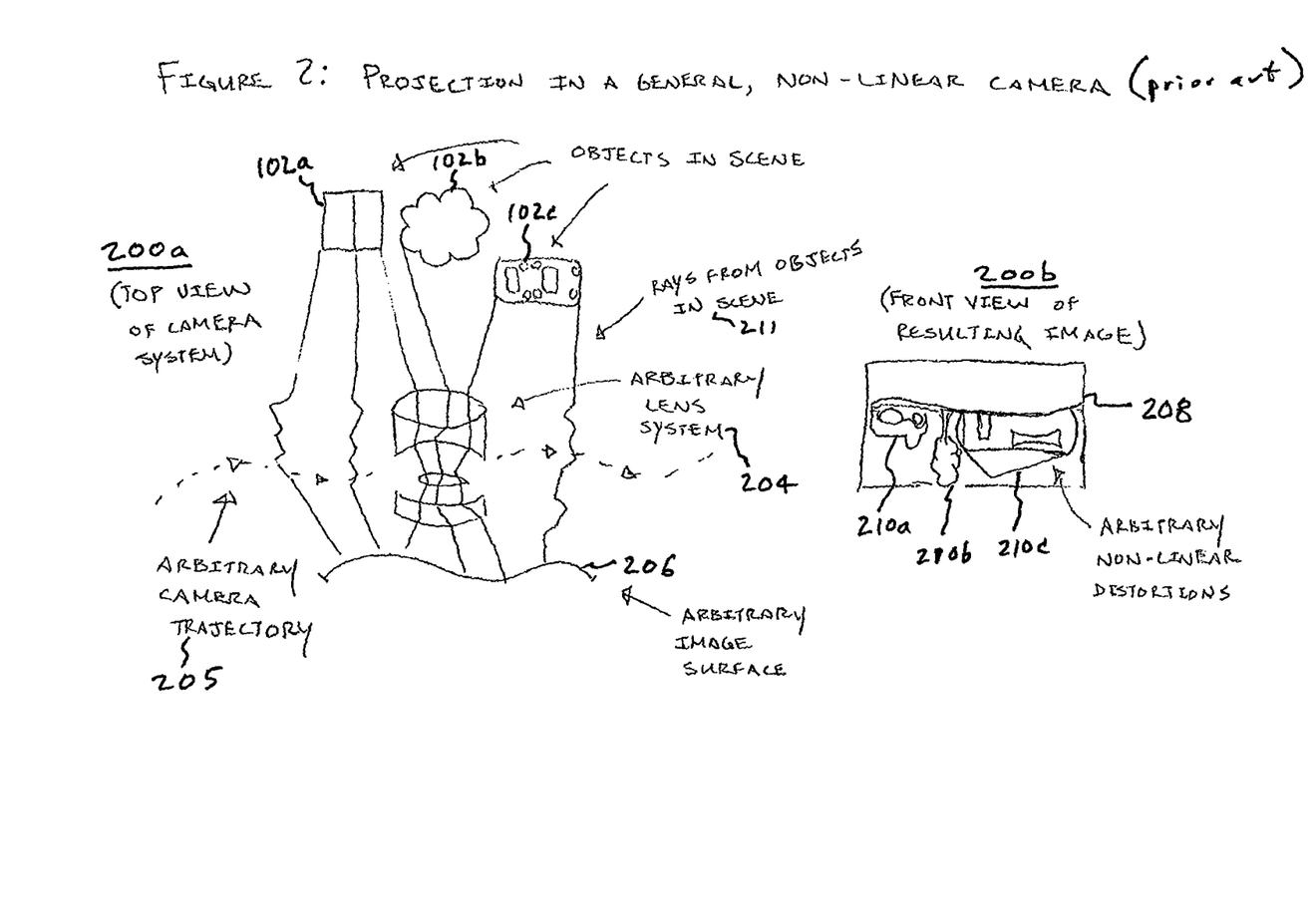
FIG. 2 is a block diagram of a projection in a general, non-linear camera system.

FIG. 2 provides an exemplary depiction of projection distortion in general, non-linear cameras due to camera movement/trajectory and/or lens distortion. From the top view 200a, rays 211 from objects 102a, 102b, 102c proceed through an arbitrary lens system 204 onto an arbitrary image surface 206. As indicated by trajectory path 205, the generalized camera may be in motion, which, particularly for a rolling shutter camera, means that different pixels may actually have different generalized camera attributes. Lens distortion, camera motion, and rolling shutters are factors which increase non-linear image distortion in generalized cameras. A front planar view 200b of the resulting image surface 208 shows non-linear distortions in the object images 210a, 210b, 210c.

Moving cameras, rolling shutters and lens distortion together represent a great challenge for traditional SFM algorithms for at least two reasons. First, due to the lens distortions and rolling shutters, the camera projection functions are non-linear. Second, due to the rolling shutters, the camera projection is itself a function of the camera trajectories because the center of projection of a moving rolling shutter camera follows the camera trajectory. A moving rolling shutter camera therefore cannot be approximated with a linear camera, so traditional SFM algorithms that rely on linear or linearized camera models fail.

There currently exist techniques to perform SFM using non-linear camera models, such as those including lens distortion, directly. An important limitation to this approach is computational speed—optimization over non-linear functions is by its nature significantly quantitatively slower than optimization over linear functions. Furthermore, the heterogeneity of non-linear camera models, such as the difference between an aspherical lens camera model and a fisheye camera model, make integrating many non-linear cameras in a single optimization task difficult.

There is also academic work on minimal problems for generalized cameras in a Ph.D dissertation by Henrik Stewenius: H. Stewenius, "Grobner Basis Methods for Minimal Problems in Computer Vision", Ph.D thesis, Lund University, April 2005. These "minimal problems" focus on recovering the relative pose between two generalized cameras given a minimum number of feature correspondences between them. For example, one can recover the relative pose between two generalized cameras given 6 correspondences. This may be used in SFM problems in a RANSAC loop to find the relative pose between generalized cameras, but the solution method is both too brittle and too computationally expensive for practical use. It may be assumed that the relative pose between generalized cameras is already known by this or some other method.

Thus, there is a need for a systems and methods for simplifying SFM problems in general cameras, especially those that are in motion with rolling shutters and/or which introduce lens distortion.

SUMMARY

Methods and systems for efficiently performing structure from motion ("SFM") involving one or more cameras (including, but not limited to moving rosettes of rolling shutter cameras) with or without significant lens distortion are provided. In an implementation, a general camera image is examined to identify local image features. New images, i.e., "feature camera" images, are then generated, each centered on one of the identified local image features. These images are "locally" linear in the area of the image feature on which they are centered.

In implementations, a system and method are provided for extraction of 3D geometry from a plurality of generalized camera images by a device that includes an electronic circuit. The method executed by the electronic circuit includes identifying one or more feature locations in each of the generalized camera images, each feature location comprising an x and y coordinate, an orientation, and a scale, extracting a local image feature at each feature location, generating a feature camera centered on each feature location, identifying groups of feature cameras providing consistent triangulation opportunity, and, triangulating each identified feature camera group by finding the 3D point that minimizes an error term.

Implementations may use any of several known algorithms for selecting local image features for extraction, such as, but not limited to a SIFT algorithm, a MOP algorithm or a SURF algorithm.

Implementations may also choose to minimize any of several different error terms during triangulating feature camera groups, such as, but not limited to: distance in 3D from one or more feature camera ray; and, distance in 2D in each feature camera from an image center to a projection of a 3D point.

In an implementation, identifying groups of feature cameras may be performed by the electronic circuit using one or more of: an exhaustive search, a directed search informed by matching features of similar appearance, and/or a directed search informed by the geometric proximity of feature camera rays in 3D.

In another implementation, the above generation of feature cameras further includes first obtaining a feature camera center pixel (x, y) from a camera pose at time T(x, y), where T(x, y) is a rolling shutter function yielding the exposure time of center pixel (x, y). Next, a feature camera orientation is determined from the camera pose at T(x, y) adjusted by a lens distortion function at feature location (x, y). Then, a feature camera focal length is obtained from the generalized camera image.

In a further implementation, the feature camera focal length is normalized by measuring an angular resolution p_center at the center of the generalized camera image, measuring an angular resolution p_feature at the feature location (x, y) of the feature camera, and calculating a normalized feature camera focal length f_feature, wherein:

$$f\_feature = f\_nominal \times (p\_center/p\_feature),$$

where f_nominal is a nominal focal length of the generalized camera in a monolithic camera model.

BRIEF DESCRIPTION OF THE DRAWINGS

Embodiments will be described with reference to the following drawing figures, in which like numerals represent like items throughout the figures, and in which.

DETAILED DESCRIPTION

Example implementations of the present invention are described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

A "rosette" is used herein to refer to a rigid arrangement of cameras. Rosettes are often employed to extend the field of view of the camera system beyond that of a single camera. The cameras usually do not have the same center of projection.

A "generalized camera" is used herein to mean a camera where different pixels do not share the same center of projection. Generalized cameras may arise from exotic optics (e.g. catadioptric optical systems) as well as from rolling shutter cameras in motion, and the like.

The phrase "lens distortion" as used herein denotes how light rays deviate from a pinhole projection model as they pass through the lens system of a camera.

The word "feature" as used herein denotes a distinctive subset of an image that can be programmatically detected. Features are often used to identify identical parts of a scene viewed from multiple cameras. A feature in an image may be as small as a single pixel, or may comprise numerous pixels. A feature may also refer to allocation in an image where a point of inflection or change of direction of viewed item occurs.

A key to the illustrative systems and methods is that SFM problems, to operate, do not need a monolithic camera model that applies to all pixels in an image. In the embodiments described herein, SFM operations are applied to only particular locations in an image at any given time: so-called "feature locations". It is only at these locations and in their immediate vicinity that camera models are needed. Thus, it suffices to create a camera model for each feature separately: a "local feature camera", or simply "feature camera". The feature camera need be valid only near the feature location; it need not be valid far from the feature location. Feature cameras may overlap.

Figure 3:
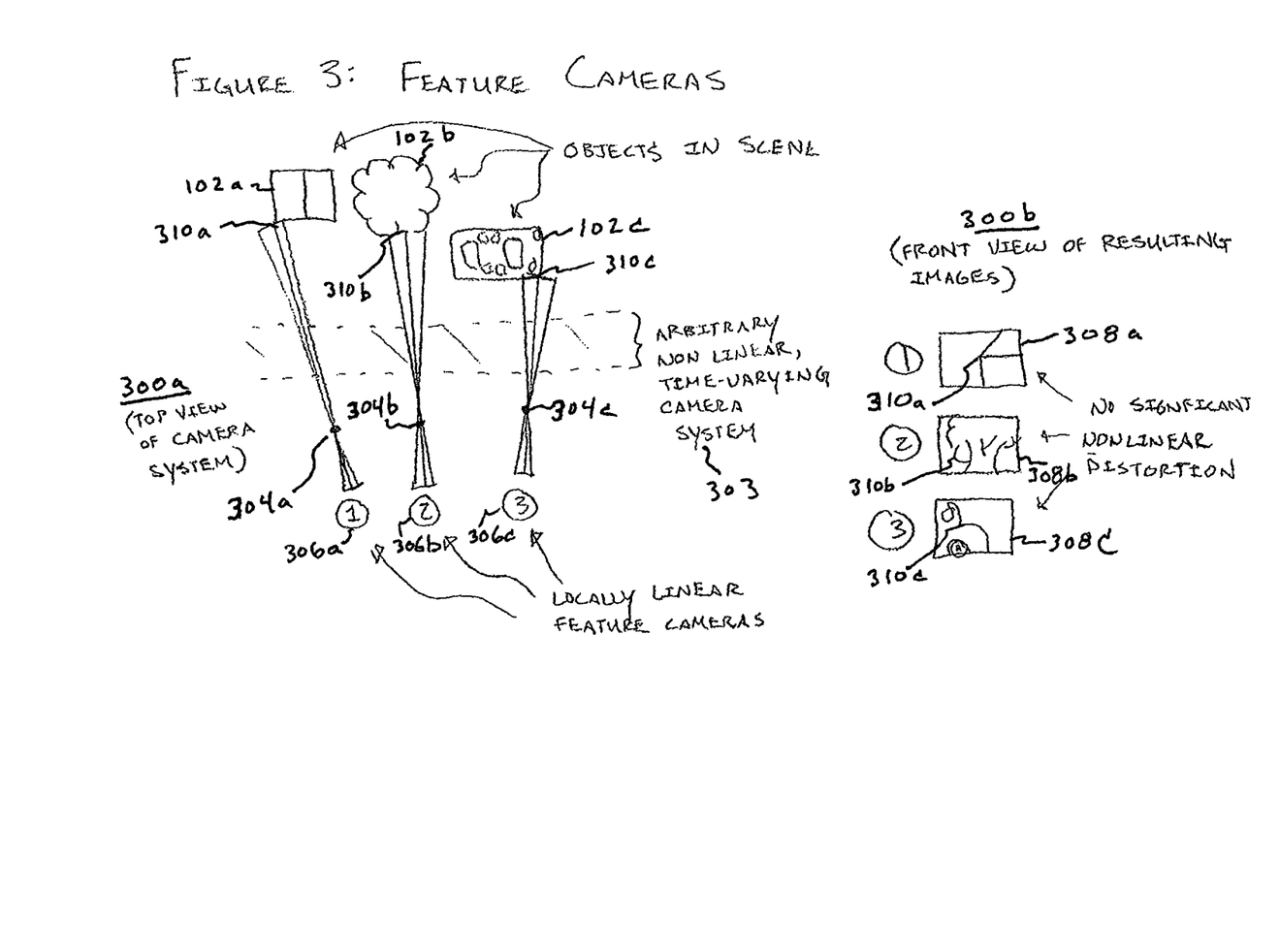
FIG. 3 is a block diagram of projection in a feature camera system.

Although the camera model in general may be complex and non-linear, involving for example a moving camera with lens distortion and a rolling shutter, the feature cameras may be implemented as simple linear perspective cameras. This amounts to a local linearization of the camera model at each feature location. Although some error is introduced in this approximation, since cameras move slowly compared to the rolling shutter speed and because lens distortion functions are smooth, a linear feature camera accurately represents the camera model in the vicinity of its feature. FIG. 3 provides a schematic illustration of locally-linear feature cameras.

Various implementations of SFM using local feature cameras may be provided in alternative devices and device applications including, but not limited to, mobile phone applications, portable computer applications, and PDA applications. Exemplary implementing system embodiments will be described below in relation to FIG. 3. Exemplary method embodiments will be described below in relation to FIGS. 4-6.

Exemplary Systems

Referring now to FIG. 3, there is provided a block diagram of an exemplary system 300a. The system 300a may include more, less, or different components than those illustrated in FIG. 1. However, the components shown are sufficient to disclose an illustrative embodiment implementing the present invention. An exemplary system 300a comprises an arbitrarily non-linear time-varying "generalized" camera system 303 for imaging objects 102a, 102b, 102c. The camera system 303 may be one or more generalized cameras, such as convention rolling shutter cameras, in motion or stationary. A generalized camera system 303 would also provide any required electronic circuit(s) to store and process received images, as is well understood by those of skill in the art. For example, one or more image sensing devices can be interfaced to processing hardware (e.g., dedicated circuitry, one or more processors configured by software, etc.) to read the image sensing device(s), store image data in memory, and analyze the image data to identify features, define local feature cameras, etc. as further set forth herein. Alternatively, a device may use a network interface to send image data to another device for analysis, e.g., by a server that carries out analysis as described herein.

Due to lens distortion, camera movement, rolling shutters, and the like, in a generalized camera system 303, different resulting image pixels may have different focal points. For example, in a conventional rolling shutter camera in motion, each column of pixels is electronically recorded or "exposed" at a slightly different time. Movement of the camera between the exposure of each column of pixels results in different focal points for each column. A conventional smart-phone typically includes a rolling shutter type camera, as well as the electronic circuits required for recording, or "latching", exposed pixels, and performing the method steps provided herein.

Alternatively, the camera system 303 may be a rosette of general cameras arranged to extend the field of view beyond that of a single camera. In this case, in addition to distortion introduced by each general camera individually, pixels from each camera have clearly different focal points from those of another camera.

In an embodiment, image features 310a, 310b, 310c are identified and virtual, locally linear feature cameras 306a, 306b, 306c are generated for each image feature 310a, 310b, 310c, respectively, each feature camera including pixels from the generalized camera for the image feature and a relatively small area around each feature. By "relatively small" it is intended that each feature camera include one or more pixels centered on the particular feature—enough pixels to identify a position of the feature and its general orientation, but few enough to minimize image distortions with respect to the generalized camera image from which it is derived. As a practical matter, this may be any number of pixels, but should be limited to the number needed to fully describe feature and it's orientation in the overall scene. In certain cases, a feature may be fully described by a single pixel, in which case feature orientation is not an issue—for example, if the feature is a single distant star in a dark field.

These feature cameras 306a, 306b, 306c each have their own focal point 304a, 304b, 304c, respectively, and are each focused on one image feature 310a, 310b, 310c, respectively. The resulting frontal views 300b of each feature camera image 308a, 308b, 308c is essentially planar—having no significant nonlinear distortion—as compared with the general camera images, especially nearest each image feature 310a, 310b, 310c. In addition, the focal lengths of each feature camera 306a, 306b, 306c may be set so that the pixel distances in the feature camera are proportional to angular distances in 3D. This pixel scale normalization simplifies calculations in SFM algorithms by removing the pixel scale variation that occurs across an image due to lens distortion.

It is significant to note that SFM algorithms do not require a monolithic camera model that applies to all pixels in an image. SFM operations can thus be applied to only one particular location—the so-called "feature location"—at a time. Thus, it is sufficient to create a camera model—feature camera—for each feature separately. The feature camera needs to be valid only near the feature location. Also, feature cameras may overlap.

Although the overall camera model in general may be complex and non-linear, involving, for example, a moving camera with lens distortion and a rolling shutter, feature cameras 306a, 306b, 306c may be simple linear perspective cameras. Generation of a feature camera 306a, 306b, 306c amounts to local linearization of the camera model at each feature location. Although there will likely still be some error in this approximation, due to the relatively slow motion of most cameras compared with their rolling shutter speed, and because lens distortion functions are smooth, a linear feature camera accurately represents the camera model in the vicinity of its associated feature.

As noted above, the system 303 implements methods for analyzing images from generalized cameras. Exemplary embodiments of such methods will now be described in relation to FIGS. 4-6.

Exemplary Methods

Figure 6:
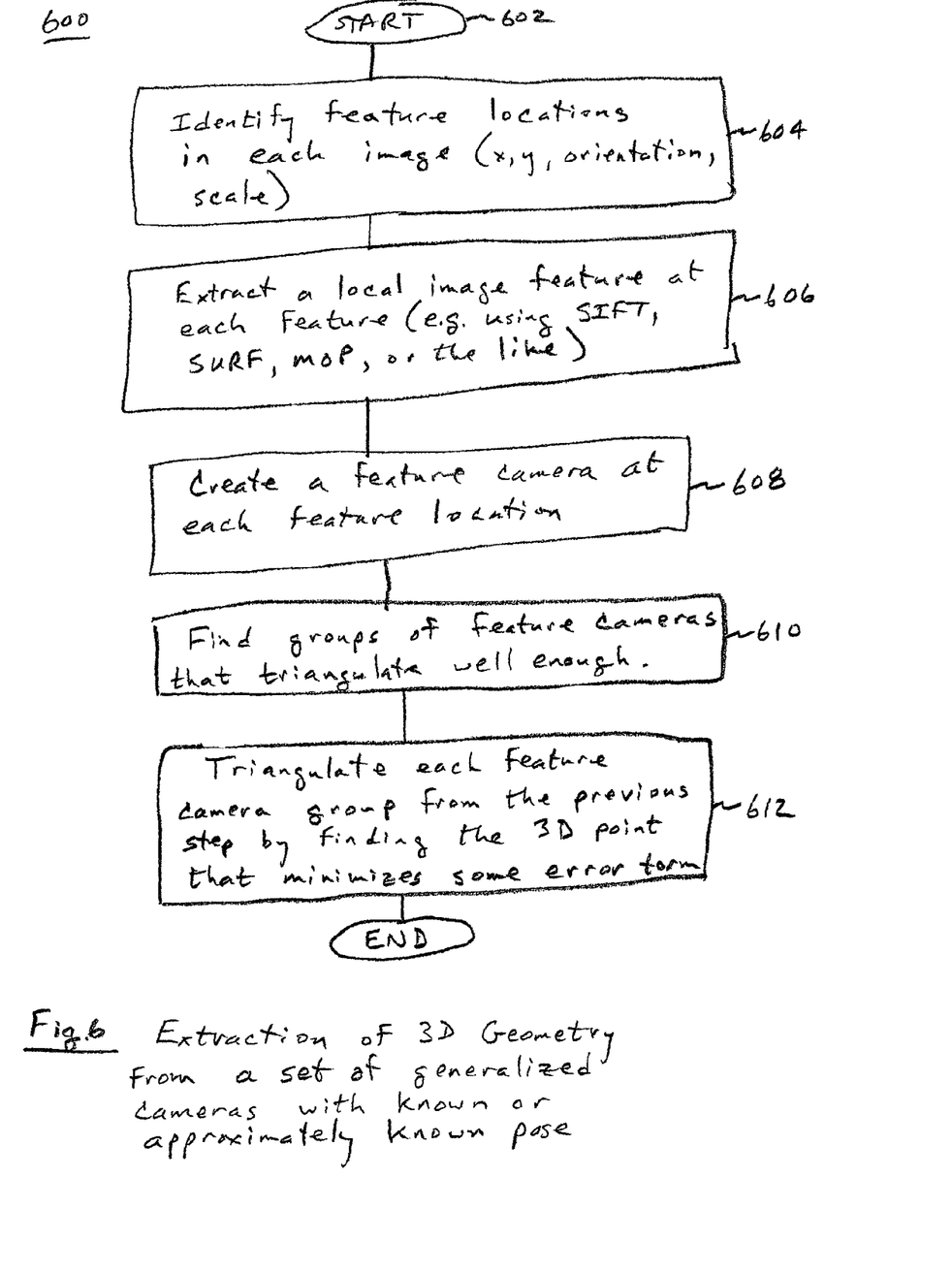
FIG. 6 is a flow diagram of an exemplary method for use in a device with an electronic circuit.

Referring now to FIG. 6, there is provided a flow diagram of an exemplary method 600 for generating or extracting 3D geometry from a set of generalized cameras with known or approximately known pose. The method 600 is useful in applications, such as mobile phone and smart phone applications, portable computer applications, PDA applications, portable navigation device applications, and any other application in which analysis of generalized camera imagery is desired: The method 600 may alternatively be performed remote—away from the time and place the generalized camera images are obtained. Further, the method 600 will be described in reference to an electronic circuit, which may be present in any device capable of running any of the applications mentioned herein.

As shown in FIG. 6, the method 600 begins with step 602 and continues with step 604. In step 604, an electronic circuit identifies feature locations in each image, determining the x and y coordinates, orientation and scale of the each feature. Features may be identified by any of several means. For example, a feature may comprise the intersection of adjoining edges, a know image element, a point of curvature or inflection, a bright area against a dark background, or the like.

Once step 604 is completed, step 606 is performed where the electronic circuit extracts a local image feature at each feature location. A variety of algorithms are available for this step, such as, but not limited to SIFT, SURF, MOP, ORB or the like. A local image feature generally represents the appearance of the image at and around the image feature location. The image feature also generally has a computed orientation and size, so one can imagine a circle of that size with a certain direction denoting, for example, "local up" for the feature. The pixels within the circle are then extracted and optionally processed. In the case of MOP, they are simply blurred. In the case of SIFT and similar features (SURF, ORB), the derivatives of the image are binned. In general, the goal is to process the pixels so that the feature is somewhat invariant to (i.e. tolerant of) image distortions such as illumination variation and perspective variation. The implementations of the invention are not limited in this regard.

Once step 606 is completed, step 608 is performed where the electronic circuit creates a feature camera at each feature location. Next, at step 610, the electronic circuit finds groups of feature cameras that triangulate well together. In some embodiments a group can be said to "triangulate well" if a consistent result is seen when the feature cameras in the group are used to determine a real-world coordinate for the same feature (e.g., the resulting coordinate is within some threshold value). These groups may be determined using any of several means, such as, but not limited to: exhaustive searching, directed searching informed by matching features of similar appearance, directed searching informed by geometric proximity of feature camera rays in 3D, directed searching informed by the consistency of features with epipolar geometry, or by directed searching informed by any combination of these.

Once step 610 is performed, step 612 is performed where the electronic circuit triangulates each feature camera group from the step 610 by finding the 3D point that minimizes some error term. Error terms which may be minimized include, but are not limited to: distance in 3D from each feature camera ray, distance in 2D in each feature camera from the image center to the projection of the 3D point—also known as the "reprojection error", or the like. Since the feature cameras approximate simple linear perspective cameras, any standard triangulation method may be used for this step.

Once step 612 is performed, step 614 is performed where method 600 ends or other processing is performed.

Figure 4:
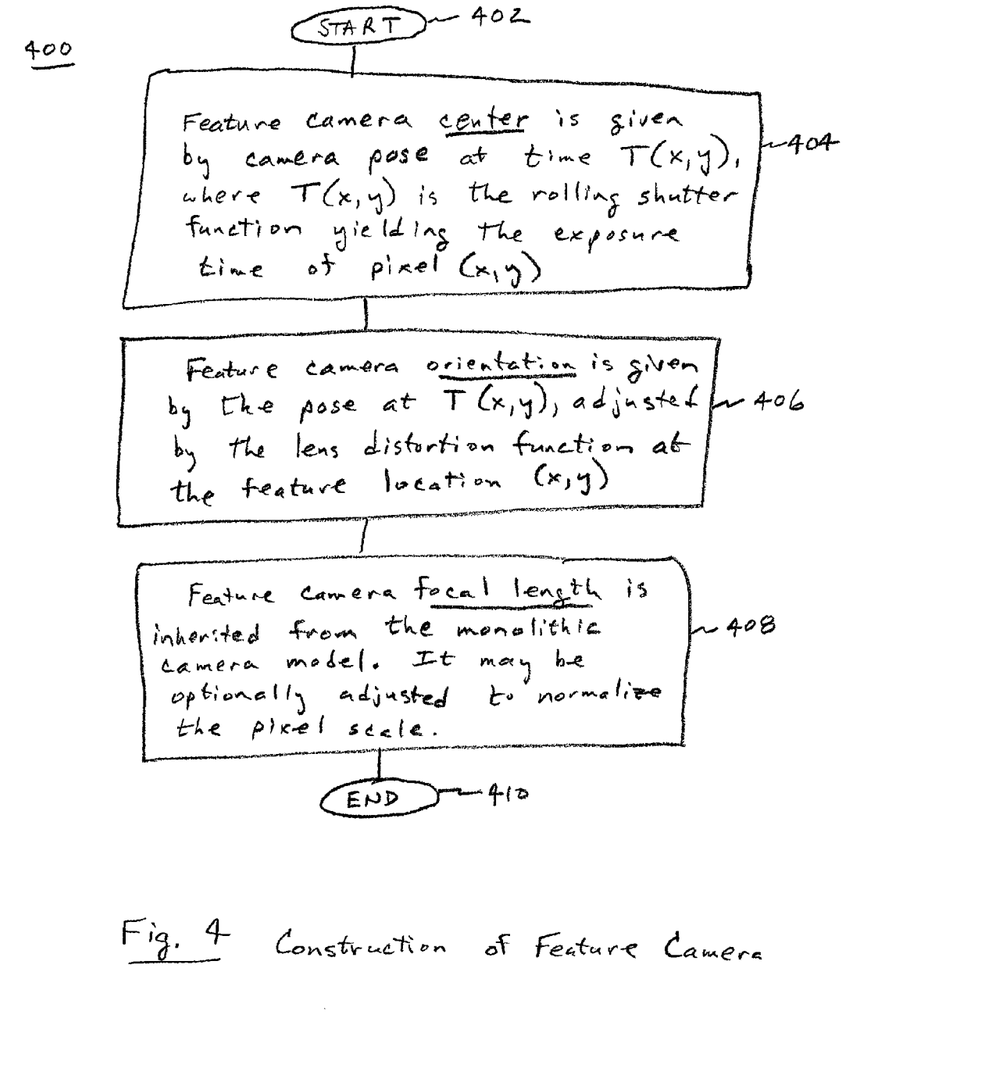
FIG. 4 is a flow diagram of an exemplary method for use in a device with an electronic circuit.

Referring now to FIG. 4, there is provided a flow diagram of an exemplary method 400 of generating a feature camera from a generalized camera image. The method 400 begins with step 402 and continues with step 404. In step 404, an electronic circuit determines the feature camera center from the camera pose at time T(x, y) where T(x, y) is the rolling shutter function yielding the exposure time of pixel (x, y), and (x, y) being the pixel coordinates of the feature.

Next, at step 406 the electronic circuit determines the feature camera orientation, which is given by the pose at T(x, y), adjusted by the lens distortion function at the feature location (x, y).

After step 406, in step 408 the electronic circuit determines the feature camera focal length. Focal length is approximated from a corresponding monolithic camera model, and may be optionally adjusted to normalize the pixel scale. The method 400 continues with step 410 where method 400 ends or other processing is performed.

Figure 5:
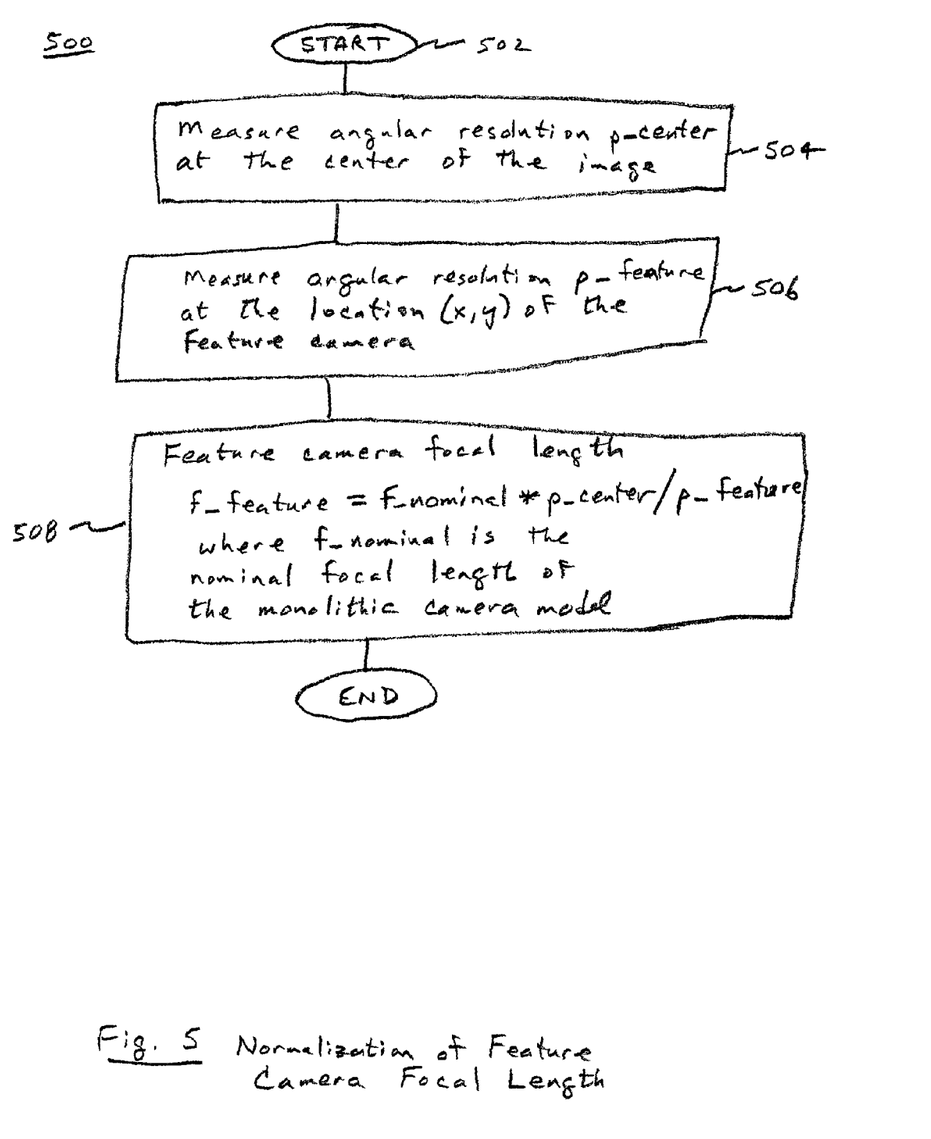
FIG. 5 is a flow diagram of an exemplary method for use in a device with an electronic circuit.

A flow diagram of an exemplary method 500 of normalizing feature camera focal length is provided in FIG. 5. Normalization of feature camera focal length provides one way to remove or minimize variation from lens distortion. The method begins with step 502 and continues with step 504. In step 504 the electronic circuit measures angular resolution p_center of a pixel at the center of the general camera image. Next, in step 506 the angular resolution p_feature of a pixel at the location (x, y) of the feature is measured. In step 508, the electronic circuit then determines the feature camera focal length f_feature, as:

$$f\_feature = f\_nominal \times (p\_center / p\_feature) \qquad (1)$$

where f_nominal is the nominal focal length of the approximating monolithic camera model.

In addition, the focal length of each feature camera may be set so that pixel distances in the feature camera are proportional to angular distances in 3D. This pixel scale normalization simplifies matters in SFM algorithms by removing the pixel scale variation that occurs across an image due to lens distortion.

Methods that create feature cameras that are linearized around the precise location of an identified image feature are described herein. Alternatively, "feature cameras" could be created based on the particular non-linearity of a physical camera model.

In one example of an alternative feature camera: in the case of linear, perspective column-based rolling shutter cameras, a separate linear camera could be created for each column which is itself captured instantaneously, and this model used for SFM. Locally linear models could similarly be created based on the particular shutter roll or time-varying exposure pattern of any linear, perspective camera.

In another example of an alternative feature camera: if the lens distortion of a camera is radial, a separate, linear camera model could be made for discrete angular deflections from the physical camera center and SFM could be similarly applied. Any smooth model of lens distortion could similarly be discretized in to linear pieces and linear SFM techniques could be applied thereunto.

In an exemplary usage, the described systems and methods may be used to implement local, linear cameras for extracting SFM geometry from the data collected by photographic mapping surveys. In particular, all generations of STREET VIEW™ vehicles generate generalized camera views which may be processed in accordance with the above methods to generate 3D geometry. STREET VIEW™ geometry may be incorporated into a number of products providing various uses, such as but not limited to: (a) help determine the precise location and orientation of a STREET VIEW™ capture vehicle at any given time; (b) create street-level geometric models for interactive user selection and navigation in the STREET VIEW™ interface; and (c) localize query images based on the 3D locations of feature-enhanced point clouds.

Additional examples of using the described systems and methods are also envisioned. For instance, since the use of rolling shutter cameras are commonplace in hand-held devices such as cell phones, tablet computers, or digital cameras and digital video cameras, as these devices are used to gather and mine image information for 3D content, the methods described herein will naturally be used to handle the non-linearity that movement. rolling shutter cameras and lens distortion introduce. Indeed, any application involving SFM with moving, rolling shutter cameras and/or significant lens distortion is likely to require an implementation of an SFM approach similar to those described herein. Of course, the techniques discussed herein could be applied regardless of image capture technology.

Some additional examples of potential applications for the described systems and methods include, but are not limited to: (a) "Augmented Reality" applications that track objects in a camera viewport with non-linear lens distortion and/or a rolling shutter; (b) 3D geometry extraction products that make use of similar cameras; and (c) Localization applications that determine the location of a similar camera by using features in the image space of that camera.

In various implementations, the methods described above may be implemented in systems and devices which include non-transient computer-readable media. Such systems may include at least one electronic circuit configured to perform the methods described above. For example, any of the methods or systems disclosed herein can be implemented in a computer system comprising hardware, such as processor configured by software instructions, or other hardware circuitry. Geometry could be extracted at the same device that captures imagery or the image data could be sent to another device (e.g., a server) that analyzes the image and recovers geometry data. Devices which include non-transient computer readable media may also include computer programs having a number of code sections. These code sections may be executable by a computer to cause the computer to perform the methods described herein.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for extraction of 3D geometry from a plurality of generalized camera images by a device that comprises an electronic circuit, the method comprising:
   identifying, by the electronic circuit, one or more feature locations in each of the plurality of generalized camera images, each feature location comprising an x and y coordinate, an orientation, and a scale;
   extracting, by the electronic circuit, a local image feature at each feature location;
   generating, by the electronic circuit, a virtual feature camera centered on each feature location;
   identifying, by the electronic circuit, groups of feature cameras, each group of feature cameras comprising one or more of the virtual feature cameras, wherein each group of feature cameras is identified as providing consistent triangulation opportunity by determining virtual feature cameras that provide real-world coordinates for a same local image feature that are within a threshold value; and,
   triangulating, by the electronic circuit, each identified feature camera group by finding the 3D point that minimizes an error term,
   wherein the generating the virtual feature cameras comprises:
      obtaining, by the electronic circuit, a feature camera center pixel from a camera pose at a first time; and
      creating, by the electronic circuit, virtual linear camera models at each feature location of each extracted local image feature separately, each virtual linear camera model being centered on its respective feature location based on the obtaining.

2. The method according to claim 1, wherein the extracting is performed by the electronic circuit using one of a Scale Invariant Feature Transform (SIFT) algorithm, a Multi-Objective Problem (MOP) algorithm and a Speed Up Robust Features (SURF) algorithm.

3. The method according to claim 1, wherein the error term to be minimized is selected from the group comprising: distance in 3D from one or more feature camera ray; and, distance in 2D in each feature camera from an image center to a projection of a 3D point.

4. The method according to claim 1, wherein the identifying groups of feature cameras is performed by the electronic circuit using one or more of:
   an exhaustive search,
   a directed search informed by matching features of similar appearance, and
   a directed search informed by the geometric proximity of feature camera rays in 3D.

5. The method according to claim 1, wherein the generating of a feature camera comprises:
   obtaining, by the electronic circuit, a feature camera center pixel (x, y) from a camera pose at time T(x, y), where T(x, y) is a rolling shutter function yielding the exposure time of center pixel (x, y);
   determining, by the electronic circuit, a feature camera orientation from the camera pose at T(x, y) adjusted by a lens distortion function at feature location (x, y); and,
   obtaining, by the electronic circuit, a feature camera focal length from the generalized camera image.

6. A method for extraction of 3D geometry from a plurality of generalized camera images by a device that comprises an electronic circuit, the method comprising:
   identifying, by the electronic circuit, one or more feature locations in each of the plurality of generalized camera images, each feature location comprising an x and y coordinate, an orientation, and a scale;
   extracting, by the electronic circuit, a local image feature at each feature location;
   generating, by the electronic circuit, a feature camera centered on each feature location;
   identifying, by the electronic circuit, groups of feature cameras providing consistent triangulation opportunity; and, triangulating, by the electronic circuit, each identified feature camera group by finding the 3D point that minimizes an error term
   wherein generating the feature camera comprises:
      obtaining, by the electronic circuit, a feature camera center pixel (x, y) from a camera pose at time T(x, y), where T(x, y) is a rolling shutter function yielding the exposure time of center pixel (x, y);
      determining, by the electronic circuit, a feature camera orientation from the camera pose at T(x, y) adjusted by a lens distortion function at feature location (x, y); and,
      obtaining, by the electronic circuit, a feature camera focal length from the generalized camera image; and
   the method further comprises normalizing the feature camera focal length, the normalizing comprising:
      measuring, by the electronic circuit, an angular resolution p_center at the center of the generalized camera image;
      measuring, by the electronic circuit, an angular resolution p_feature at the feature location (x, y) of the feature camera; and,
      calculating, by the electronic circuit, a normalized feature camera focal length f_feature, wherein:

$$f\_feature = f\_nominal \times (p\_center / p\_feature);$$

where f_nominal is a nominal focal length of the generalized camera in a monolithic camera model.

7. A system for extraction of 3D geometry from a plurality of generalized camera images, the system comprising:
   at least one generalized camera recording a plurality of generalized camera images, the camera in communication with a device comprising an electronic circuit configured to:
   identify one or more feature locations in each of the plurality of generalized camera images, each feature location comprising an x and y coordinate, an orientation, and a scale;
   extract a local image feature at each feature location;
   generate a virtual feature camera centered on each feature location;
   identify groups of feature cameras, each group of feature cameras comprising one or more of the virtual feature cameras, wherein each group of feature cameras is identified by determining virtual feature cameras that provide a real-world coordinate for the same local image feature that are within a threshold value; and,
   triangulate each identified feature camera group by finding the 3D point that minimizes an error term,
   wherein the generating the virtual feature cameras comprises:
      obtaining a feature camera center pixel from a camera pose at a first time; and
      creating virtual linear camera models at each feature location of each extracted local image feature separately, each virtual linear camera model being centered on its respective feature location based on the obtaining.

8. The system according to claim 7, wherein the extract of the local image feature is performed by the electronic circuit using one of a Scale Invariant Feature Transform (SIFT) algorithm, a Multi-Objective Problem (MOP) algorithm or a Speed Up Robust Features (SURF) algorithm.

9. The system according to claim 7, wherein the error term to be minimized is selected from the group comprising: distance in 3D from one or more feature camera ray; and, distance in 2D in each feature camera from an image center to a projection of a 3D point.

10. The system according to claim 7, wherein the identifying groups of feature cameras is performed by the electronic circuit using one or more of:
   an exhaustive search,
   a directed search informed by matching features of similar appearance, and
   a directed search informed by the geometric proximity of feature camera rays in 3D.

11. The system according to claim 7, wherein the electronic circuit, in order to generate a feature camera,
   obtains a feature camera center pixel (x, y) from a camera pose at time T(x, y), where T(x, y) is a rolling shutter function yielding the exposure time of center pixel (x, y);
   determines a feature camera orientation from the camera pose at T(x, y) adjusted by a lens distortion function at feature location (x, y); and,
   obtains a feature camera focal length from the generalized camera image.

12. A system for extraction of 3D geometry from a plurality of generalized camera images, the system comprising:
   at least one generalized camera recording a plurality of generalized camera images, the camera in communication with a device comprising an electronic circuit configured to:
   identify one or more feature locations in each of the plurality of generalized camera images, each feature location comprising an x and y coordinate, an orientation, and a scale;
   extract a local image feature at each feature location;
   generate a feature camera centered on each feature location;
   identify groups of feature cameras providing consistent triangulation opportunity; and,
   triangulate each identified feature camera group by finding the 3D point that minimizes an error term;
   wherein the electronic circuit, in order to generate a feature camera:
   obtains a feature camera center pixel (x, y) from a camera pose at time T(x, y), where T(x, y) is a rolling shutter function yielding the exposure time of center pixel (x, y);
   determines a feature camera orientation from the camera pose at T(x, y) adjusted by a lens distortion function at feature location (x, y); and,
   obtains a feature camera focal length from the generalized camera image; and
   wherein the electronic circuit further operates to normalize the feature camera focal length by:
   measuring an angular resolution p_center at the center of the generalized camera image;
   measuring by the electronic circuit, an angular resolution p_feature at the feature location (x, y) of the feature camera; and,
   calculating a normalized feature camera focal length f_feature, wherein:

$$f\_feature = f\_nominal \times (p\_center / p\_feature);$$

where f_nominal is a nominal focal length of the generalized camera in a monolithic camera model.

13. A device comprising an electronic circuit and a non-transitory computer-readable storage medium having stored thereon a computer program for analyzing road quality information, the computer program having a plurality of code sections, the code sections executable by a computer to cause the computer to perform the steps of:
   identifying, by the electronic circuit, one or more feature locations in each of the plurality of generalized camera images, each feature location comprising an x and y coordinate, an orientation, and a scale;
   extracting, by the electronic circuit, a local image feature at each feature location;
   generating, by the electronic circuit, a virtual feature camera centered on each feature location;
   identifying, by the electronic circuit, groups of feature cameras, each group of feature cameras comprising one or more of the virtual feature cameras, wherein each group of feature cameras is identified by determining virtual feature cameras that provide a real-world coordinate for the same local image feature that are within a threshold value; and
   triangulating, by the electronic circuit, each identified feature camera group by finding the 3D point that minimizes an error term,
   wherein the generating the virtual feature cameras comprises:
      obtaining a feature camera center pixel from a camera pose at a first time; and
      creating virtual linear camera models at each feature location of each extracted local image feature separately, each virtual linear camera model being centered on its respective feature location based on the obtaining.

14. The device according to claim 13, wherein the extracting is performed by the electronic circuit using one of a Scale Invariant Feature Transform (SIFT) algorithm, a Multi-Objective Problem (MOP) algorithm and a Speed Up Robust Features (SURF) algorithm.

15. The device according to claim 13, wherein the error term to be minimized is selected from the group comprising: distance in 3D from one or more feature camera ray; and, distance in 2D in each feature camera from an image center to a projection of a 3D point.

16. The device according to claim 13, wherein the identifying groups of feature cameras is performed by the electronic circuit using one or more of:
    an exhaustive search,
    a directed search informed by matching features of similar appearance, and
    a directed search informed by the geometric proximity of feature camera rays in 3D.

17. The device according to claim 13, wherein the generating of a feature camera comprises:
    obtaining, by the electronic circuit, a feature camera center pixel (x, y) from a camera pose at time T(x, y), where T(x, y) is a rolling shutter function yielding the exposure time of center pixel (x, y);
    determining, by the electronic circuit, a feature camera orientation from the camera pose at T(x, y) adjusted by a lens distortion function at feature location (x, y); and,
    obtaining, by the electronic circuit, a feature camera focal length from the generalized camera image.

18. A device comprising an electronic circuit and a non-transitory computer-readable storage medium having stored thereon a computer program for analyzing road quality information, the computer program having a plurality of code sections, the code sections executable by a computer to cause the computer to perform the steps of:

identifying, by the electronic circuit, one or more feature locations in each of the plurality of generalized camera images, each feature location comprising an x and y coordinate, an orientation, and a scale;
extracting, by the electronic circuit, a local image feature at each feature location;
generating, by the electronic circuit, a feature camera centered on each feature location;
identifying, by the electronic circuit, groups of feature cameras providing consistent triangulation opportunity; and,
triangulating, by the electronic circuit, each identified feature camera group by finding the 3D point that minimizes an error term;
wherein the generating of a feature camera comprises:
obtaining, by the electronic circuit, a feature camera center pixel (x, y) from a camera pose at time T(x, y), where T(x, y) is a rolling shutter function yielding the exposure time of center pixel (x, y);
determining, by the electronic circuit, a feature camera orientation from the camera pose at T(x, y) adjusted by a lens distortion function at feature location (x, y); and,
obtaining, by the electronic circuit, a feature camera focal length from the generalized camera image; and
the steps further comprising normalizing the feature camera focal length, the normalizing comprising:
measuring, by the electronic circuit, an angular resolution p_center at the center of the generalized camera image;
measuring, by the electronic circuit, an angular resolution p_feature at the feature location (x, y) of the feature camera; and,
calculating, by the electronic circuit, a normalized feature camera focal length f_feature, wherein:

$f\_feature = f\_nominal \times (p\_center / p\_feature);$ where f_nominal is a nominal focal length of the generalized camera in a monolithic camera model.

* * * * *